(12) United States Patent
Pagot et al.

(10) Patent No.: US 8,210,152 B2
(45) Date of Patent: Jul. 3, 2012

(54) FUEL MIXTURE COMBUSTION CONTROL METHOD FOR A SPARK-IGNITION INTERNAL-COMBUSTION ENGINE, NOTABLY A SUPERCHARGED ENGINE

(75) Inventors: Alexandre Pagot, Rueil Malmaison (FR); Jean-Marc Zaccardi, Seynod (FR)

(73) Assignee: IFP, Cedex (FR)

( * ) Notice: Subject to any disclaimer, the term of this patent is extended or adjusted under 35 U.S.C. 154(b) by 253 days.

(21) Appl. No.: 12/562,312

(22) Filed: Sep. 18, 2009

(65) Prior Publication Data

US 2011/0067672 A1    Mar. 24, 2011

(30) Foreign Application Priority Data

Sep. 18, 2008  (FR) ...................... 08 05135

(51) Int. Cl.
*F02B 3/12* (2006.01)
(52) U.S. Cl. ................... 123/295; 123/299; 123/406.45; 123/406.47
(58) Field of Classification Search .................. 123/295, 123/299, 406.45, 406.47
See application file for complete search history.

(56) References Cited

U.S. PATENT DOCUMENTS

| | | | |
|---|---|---|---|
| 6,691,671 B2 * | 2/2004 | Duffy et al. ................... | 123/299 |
| 7,128,047 B2 * | 10/2006 | Kuo et al. ...................... | 123/299 |
| 7,284,506 B1 * | 10/2007 | Sun et al. ...................... | 123/1 A |
| 7,654,245 B2 * | 2/2010 | Kohler et al. ................. | 123/299 |
| 7,963,273 B2 * | 6/2011 | Winstead ................. | 123/568.14 |
| 2004/0182359 A1 * | 9/2004 | Stewart et al. ................ | 123/295 |
| 2005/0098156 A1 * | 5/2005 | Ohtani .......................... | 123/431 |
| 2006/0021422 A1 * | 2/2006 | Demura et al. .............. | 73/35.01 |
| 2006/0144365 A1 | 7/2006 | Miyashita | |
| 2007/0256648 A1 * | 11/2007 | Sun et al. ...................... | 123/1 A |

FOREIGN PATENT DOCUMENTS

| | | |
|---|---|---|
| EP | 0 849 459 B1 | 6/1998 |
| EP | 1 574 697 A1 | 9/2005 |
| FR | 2 879 666 A1 | 6/2006 |
| JP | 2002-339780 | 11/2002 |
| JP | 2004-052624 | 2/2004 |
| JP | 2007-292059 | 11/2007 |

OTHER PUBLICATIONS

Frech Search Report, 0805135, May 25, 2009.

* cited by examiner

*Primary Examiner* — Erick Solis
(74) *Attorney, Agent, or Firm* — Antonelli, Terry, Stout & Kraus, LLP.

(57) ABSTRACT

The present invention relates to a method of controlling the combustion of a spark-ignition internal-combustion engine, in particular a supercharged engine, wherein the engine comprises at least one cylinder (12) with a combustion chamber (14), intake means (16), exhaust means (22) and fuel supply means (44) allowing a fuel mixture to be achieved in said combustion chamber.

According to the invention, the method consists in:
establishing, between a slow engine speed (Rf) and a low engine speed (Rb), a curve (C2) of the limit values (P2) of the load of cylinder (12) above which pre-ignition of the fuel mixture is favored,
evaluating the effective cylinder load,
heterogenizing, between the slow engine speed (Rf) and the low engine speed (Rb), the fuel mixture when the evaluated load value is close to the limit value (P2) established.

10 Claims, 1 Drawing Sheet

FUEL MIXTURE COMBUSTION CONTROL METHOD FOR A SPARK-IGNITION INTERNAL-COMBUSTION ENGINE, NOTABLY A SUPERCHARGED ENGINE

FIELD OF THE INVENTION

The present invention relates to a method of controlling the combustion of a fuel mixture for a spark-ignition internal-combustion engine, notably a supercharged engine.

It more particularly relates to a method intended for a direct or indirect fuel injection supercharged engine, notably of gasoline type.

BACKGROUND OF THE INVENTION

As described in French patent application No. 2,897,900 filed by the applicant, this type of engine includes a cylinder with a combustion chamber containing a fuel mixture.

This fuel mixture conventionally undergoes a compression stage by the piston of this engine, then a combustion stage. This combustion is performed under the effect of a spark ignition, such as a spark plug.

As described in this patent application, this fuel mixture can undergo an abnormal combustion due to a pre-ignition thereof before the mixture is ignited, by the spark plug for example.

This abnormal combustion, which is different from knocking combustion, generally occurs with engines, mainly highly supercharged engines, which have undergone a stage of capacity reduction referred to as downsizing. The purpose of this stage is to reduce the size and the capacity of the engine while keeping the same power and the same torque as conventional engines, which makes them likely to be subject to pre-ignition.

Thus, considering the high pressures and the high temperatures reached in the combustion chamber as a result of supercharging, an abnormal combustion start (or pre-ignition) can occur, generally sporadically, and sometimes well before ignition of the fuel mixture by the spark plug takes place. This notably occurs at high engine loads and low engine speeds.

If this fuel mixture pre-ignition causes a violent abnormal combustion, random and sporadic, it is referred to as rumble and it can generate very high pressure levels in the combustion chamber (above 100 bars). These pressure levels that go together with an increase in thermal transfers with the cylinder and the piston of the engine can cause partial or total destruction of the moving elements of the engine, and the engine can even run out of order.

The present invention therefore aims to overcome the aforementioned drawbacks by means of preventive action allowing to control, to limit or even to prevent pre-ignition of the fuel mixture.

SUMMARY OF THE INVENTION

The present invention thus relates to a method of controlling the combustion of a spark-ignition internal-combustion engine, in particular a supercharged engine, wherein the engine includes at least one cylinder with a combustion chamber, intake means with at least one intake valve and an intake pipe, exhaust means with at least one exhaust valve and an exhaust pipe, and fuel supply means allowing a fuel mixture to be achieved in said combustion chamber, characterized in that it consists in:

establishing, between a slow engine speed and a low engine speed, a curve of the limit values of the cylinder load above which pre-ignition of the fuel mixture is favoured, evaluating the effective cylinder load, heterogenizing, between the slow engine speed and the low engine speed, the fuel mixture when the evaluated load value is close to the limit value established.

The method can consist in establishing, between the slow engine speed and the low engine speed, a cylinder load value curve from which heterogenization of the fuel mixture is started.

The method can consist in controlling the fuel injection parameters of the fuel supply means to achieve heterogenization of the fuel mixture.

The method can consist, when the fuel supply means feed fuel directly into the combustion chamber, in carrying out at least two successive fuel injections into said chamber to heterogenize the fuel mixture.

The method can consist, when the fuel supply means feed fuel into the combustion chamber indirectly through two intake pipes, in carrying out dissymmetrical fuel injections to heterogenize the fuel mixture.

The method can consist in carrying out a fuel injection in one of the pipes, then a fuel injection in the other pipe.

The method can consist in carrying out a fuel injection in one of the pipes in a larger proportion than the fuel injection in the other pipe.

The method can consist, when the fuel supply means feed fuel directly and indirectly into the combustion chamber, in carrying out a fuel injection through the fuel indirect supply means and in feeding the fuel mixture into the combustion chamber, then in carrying out a fuel injection in the combustion chamber to obtain a fuel mixture.

BRIEF DESCRIPTION OF THE FIGURES

Other features and advantages of the invention will be clear from reading the description hereafter, with reference to the accompanying figures wherein.

DETAILED DESCRIPTION

Figure 1:
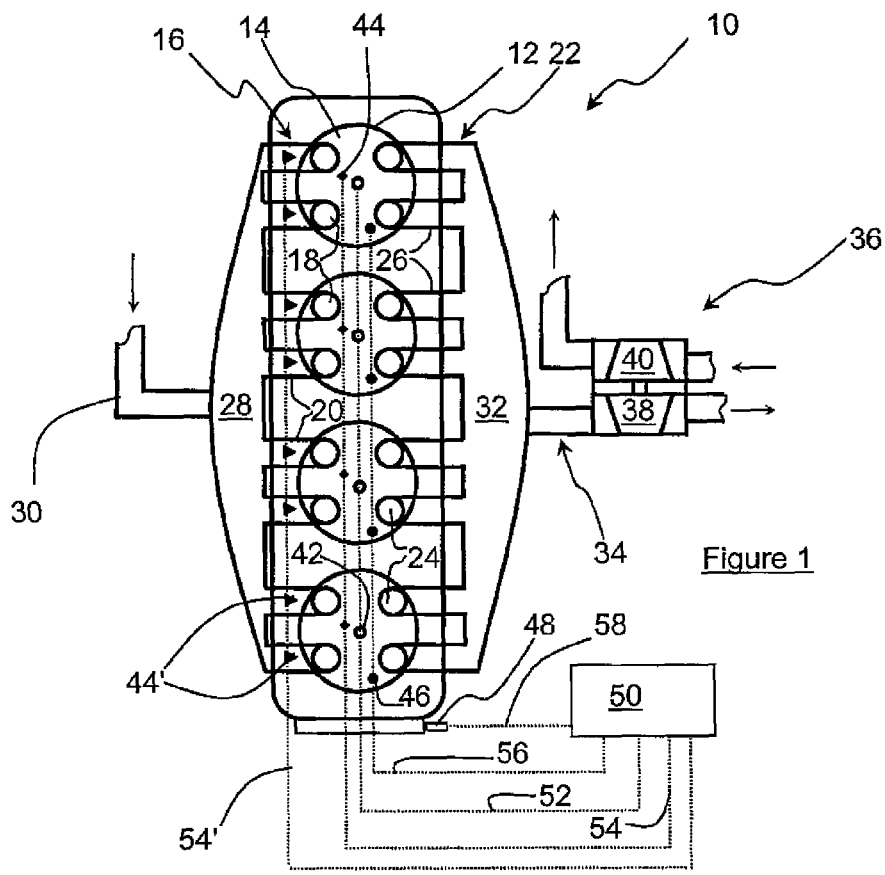
FIG. 1 shows an engine using the fuel mixture combustion control method according to the invention.

FIG. 1 shows a spark-ignition supercharged internal-combustion engine 10, in particular of gasoline type.

This does in no way rule out any other type of spark-ignition engine, like engines running on gas such as VNG (Vehicular Natural Gas) or LPG (Liquefied Petroleum Gas), or other fuels based on biofuel, ethanol, etc.

This engine comprises at least one cylinder 12 with a combustion chamber 14 generally delimited by the inner wall of the cylinder, the part of the cylinder head opposite the piston that slides within this piston and the top of the piston.

It is in this combustion chamber that combustion of a mixture of air, preferably supercharged, and of fuel, a gasoline fuel here for example, occurs.

The cylinder comprises air intake means 16 with at least one valve 18, here two intake valves, associated each with an intake pipe 20. This cylinder also comprises burnt gas exhaust means 22 with at least one exhaust valve 24 controlling each an exhaust pipe 26.

Intake pipes 20 are connected to an intake manifold 28 supplied with air, preferably supercharged, through a delivery line 30 while exhaust pipes 26 are connected to an exhaust manifold 32 itself connected to an exhaust line 34.

A supercharging device 36, a turbocompressor for example, is arranged on this exhaust line. This turbocompressor comprises a turbine 38 scavenged by the exhaust gases circulating in the exhaust line and a compressor 40 connected in rotation to the turbine so as to allow compression of the outside air and to allow this intake air under pressure (or supercharged air) into the intake manifold through line 30, then into combustion chambers 14 through intake pipes 20.

This cylinder further comprises ignition means 42, a spark plug for example, which allow to generate one or more sparks allowing the fuel mixture present in the combustion chamber of the cylinder to be ignited.

This cylinder also comprises fuel supply means 44, here in form of a fuel injector allowing fuel to be directly fed into the combustion chamber.

It comprises measuring means allowing to evaluate the load of cylinder (12).

By way of example, these means include a pressure detector 46 arranged opposite the combustion chamber, which allows to measure the pressure prevailing within this chamber so as to subsequently deduce the engine load corresponding to its mean indicated pressure MIP in bars $$\left(MIP = \frac{1}{Capacity}\int p \cdot dv\right).$$

These measuring means can also be a torque detector (not shown) that allows to deduce the engine load corresponding to its mean effective pressure MEP in bars $$\left(MEP = \frac{4\pi}{100}\frac{Torque}{Capacity}\right)$$

where Torque is the engine torque in Newton per meter (N.m) and Capacity the engine capacity in cubic decimeter ($dcm^3$)).

By way of example also, the engine load can correspond to a fuel equivalent pressure (in bar) that meets the formula $$M_{carb} * NCV * \frac{1}{Capacity} \text{ or } \frac{M_{air} * \Phi}{\Psi_S} * NCV * \frac{1}{Capacity}$$

for which:
$M_{carb}$=Mass of fuel (in gram (g))
NCV=Net calorific value (in joule per gram (j/g))
Capacity=Capacity (in cubic decimeter ($dcm^3$))
$M_{air}$=Mass of air (in gram (g))
$\Phi$=Fuel/air ratio
$\Psi_S$=Stoichiometric fuel/air ratio Of course, any other means can be used, such as ionization probes, optical sensors, . . . .

An engine rotating speed (or engine speed) detector 48 is also provided; it is preferably located on the crankshaft (not shown) of this engine and it sends a signal representative of this speed to the engine calculator. This speed measurement, associated with an instantaneous torque measurement, allows to reconstruct an image of the cylinder pressure and therefore to obtain an image of the engine load, the MEP here.

Thus, in the case of the present description, the cylinder load corresponds to the MIP, the MEP or the fuel equivalent pressure.

As it is known per se, this engine comprises a computing and control unit 50 (or engine calculator) that conventionally allows to control the operation of this engine.

This engine calculator is directly or indirectly connected by conductors to the various detectors, probes and/or detection means the engine is equipped with so as to be able to receive the signals emitted thereby (pressure in the combustion chamber, engine speed). These signals are processed by computation, then the calculator controls, through control lines, the components of this engine so as to ensure smooth running thereof.

In the case of the example shown in FIG. 1, spark plugs 42 are connected by control lines 52 to the engine calculator so as to control the generation of sparks and the ignition time of the fuel mixture. Injectors 44 are connected to this engine calculator by control lines 54 so as to control the parameters of the fuel injection into the combustion chambers, such as the amount of fuel injected and/or the injection time. Pressure detectors 46 are connected by a conductor 56 to this calculator in order to send thereto the signals representative of the pressure prevailing in the combustion chambers. Rotating speed detector 48 is connected to this calculator by an information transmission wire 58 allowing the engine speed to be known.

As is also widely known, this engine calculator comprises maps or data charts allowing to evaluate the parameters necessary for operation of the engine according to the different running conditions thereof, such as the engine speed or the power required by the driver.

Thus, some of these maps list, according to these various running conditions, the evolution of quantities related to at least one parameter representative of the state of the fuel mixture during the combustion phase, such as the quantity related to the pressure prevailing in the cylinder, more commonly referred to as cylinder pressure.

Figure 2:
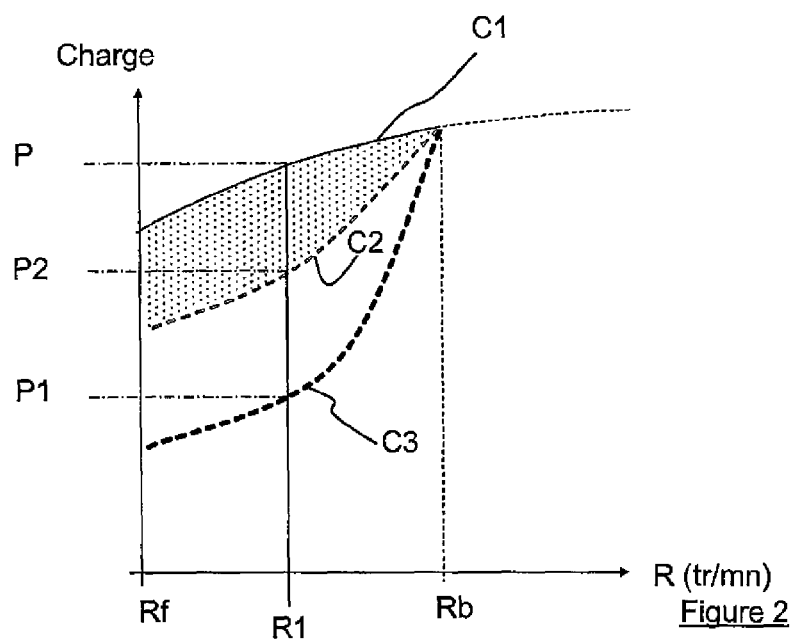
FIG. 2 shows engine load curves as a function of the rotating speed (R) of this engine.

FIG. 2 shows the evolution of the engine load represented by way of non limitative example by the evolution of the MIP (Mean Indicated Pressure in bar) in the engine cylinders as a function of the rotating speed R of the engine (or engine speed), in number of revolutions per minute (rpm).

In this figure, curve C1 shows the evolution of the maximum engine load from the slow rotating speed Rf of the engine (generally corresponding to its idle rotating speed, of the order of 750 rpm) to a low rotating speed Rb (generally around 2000 rpm) beyond which there are practically no pre-ignition phenomena.

During many tests and simulations performed on an engine that had been subjected to a stage of capacity reduction (or downsized engine), the applicant has been able to underline that the appearance of fuel mixture pre-ignition preferably occurs when this fuel mixture is a homogeneous mixture and when the engine operates at low engine speed (typically below 2000 rpm) and high loads.

It has consequently been possible to determine, according to the engine speed from the slow engine speed Rf to value Rb of the low engine speed, a curve representative of the evolution of the engine load (represented by curve C2) beyond which the appearance of pre-ignition is greatly favoured (shaded area in FIG. 2).

The applicant has consequently decided to parametrize the engine calculator in such a way that this engine operation configuration (homogeneous mixture+low engine speed+high loads) cannot always occur.

More precisely, preparation of the fuel mixture is degraded from a load representative curve C3 (below curve C2), between values Rf and Rb, so that the mixture present in the cylinder concerned is not a homogeneous fuel mixture when the load reached in the cylinder concerned is that of the limit curve C2.

This curve C3, as curve C2, was established from simulations and computations in order to obtain in a quasi-certain manner a heterogeneous fuel mixture when the engine load reaches the value of curve C2.

In the case of FIG. 1 and only by way of example, during engine operation, the engine calculator receives signals, on the one hand, from engine rotating speed detector 48 allowing to determine the engine speed and, on the other hand, from pressure detector 46, allowing to evaluate the MIP prevailing in the cylinder, which is the object of the measurements and is representative of the engine load.

In cases where the engine speed is higher than value Rb, the engine operates conventionally with a fuel injection intended to obtain a homogeneous fuel mixture.

If the rotating speed is below Rb, like value R1 given by way of example in FIG. 2, the potential for obtaining pre-ignition of the fuel mixture for a load above value P2 of curve C2 is high.

In this case, the calculator controls the various engine actuators to start fuel mixture degradation operations as soon as the value measured by pressure detector 46 allows to determine that the load of this cylinder reaches or exceeds value P1 of curve C3.

More precisely, the fuel injection parameters of the cylinder considered are modified when the cylinder load is greater than or equal to value P1 of curve C3. These modifications allow to obtain a fuel mixture that is not a homogeneous mixture when the load (deduced from the cylinder pressure measured by detector 46) reached for this cylinder is close to value P2 (P>P2>P1) of curve C2.

Thus, between the load values ranging between value P2 of curve C2 and value P of curve C1, the heterogeneous fuel mixture is statistically in a configuration allowing to limit the appearance of pre-ignition.

This heterogeneity thus allows to create different temperature levels in the combustion chamber as a result of the presence of fuel mixture zones with different fuel/air ratios due to fuel vaporization.

By way of first example and according to the direct-injection engine illustrated in FIG. 1, the fuel mixture heterogeneity is created by at least two successive fuel injections performed when the load of the cylinder considered reaches that of curve C3.

This succession of injections, here a double injection controlled by the engine calculator through control line 54, has the effect of delaying and degrading mixing of the fuel of the second injection with the fuel mixture already present in the combustion chamber and resulting from the first injection.

This allows to achieve a fuel mixture that is not completely homogeneous when the load in the cylinder concerned reaches curve C2 for the engine speed considered.

In the case of another example, the internal-combustion engine can be an indirect fuel injection engine with two intake valves controlling each an intake pipe.

In order to obtain such an indirect-injection engine, fuel direct supply means 44 and control line 54 illustrated in FIG. 1 are removed and replaced by fuel indirect supply means 44' connected to engine calculator 50 by a control line 54'. These fuel supply means are conventionally fuel injectors arranged at the engine intake, at the level of the intake pipes.

Thus, to achieve heterogeneity of the fuel mixture from curve C3, fuel injection is carried out by dissymmetrizing this injection between the two intake pipes, for example by delaying fuel injection in one of the intake pipes in relation to the other.

It is also possible to dissymmetrize fuel deliveries by injecting a large amount of fuel into one of the pipes and a lower amount of fuel (or no fuel at all) into the other.

The injection advance can also be degraded, for example by injecting the fuel with the intake valves in open position.

The fuel mixture obtained in the cylinder concerned is therefore a heterogeneous mixture and the appearance of the pre-ignition phenomenon is strongly limited when the load of this cylinder reaches that of curve C2.

It is also possible to use an internal-combustion engine with direct fuel supply means 44 and indirect fuel supply means 44', both controlled by engine calculator 50.

In this engine configuration, fuel mixture heterogeneity can be obtained through the direct fuel supply means.

Part of the fuel is therefore injected at the intake through indirect supply means 44' and the fuel mixture thus obtained is allowed into the combustion chamber. Direct supply means 44 then feed fuel into the combustion chamber that already contains this fuel mixture while creating a fuel mixture zone of very rich fuel/air ratio.

The mixture eventually obtained is a quasi-stratified fuel mixture that will limit the pre-ignition appearance probability when the load reached is that of curve C2.

The present invention is not limited to the embodiments described above by way of example and it encompasses any variant and equivalent.

The invention claimed is:

1. A method of controlling the combustion of a spark-ignition internal-combustion engine, wherein the engine includes at least one cylinder with a combustion chamber, intake means with at least one intake valve and an intake pipe, exhaust means with at least one exhaust valve and an exhaust pipe, fuel supply means allowing a fuel mixture to be achieved in said combustion chamber and a spark ignition device, comprising:
   establishing, between a slow engine speed and a low engine speed, a curve of the limit values of the load of the at least one cylinder above which pre-ignition of the fuel mixture before the fuel mixture is ignited by the spark ignition device is favoured,
   evaluating the effective cylinder load, and
   heterogenizing, between the slow engine speed and the low engine speed, the fuel mixture when the evaluated load value is close to the limit value established.

2. The control method as claimed in claim 1, further comprising establishing, between the slow engine speed and the low engine speed, a curve of the load values of cylinder from which heterogenization of the fuel mixture is started.

3. The control method as claimed in claim 1, further comprising controlling the fuel injection parameters of fuel supply means to achieve heterogenization of the fuel mixture.

4. The control method as claimed in claim 3 wherein fuel supply means feed fuel directly into combustion chamber, and controlling the fuel injection parameters of fuel supply means to achieve heterogenization of the fuel mixture comprises carrying out at least two successive fuel injections into said chamber to heterogenize the fuel mixture.

5. The control method as claimed in claim 4, wherein fuel supply means feed fuel into combustion chamber indirectly through two intake pipes, and controlling the fuel injection parameters of fuel supply means to achieve heterogenization of the fuel mixture comprises carrying out dissymmetrical fuel injections to heterogenize the fuel mixture.

6. The control method as claimed in claim 5, wherein carrying out dissymmetrical fuel injections to heterogenize the fuel mixture comprises carrying out a fuel injection in one of the pipes, then a fuel injection in the other pipe.

7. The control method as claimed in claim 5, wherein carrying out dissymmetrical fuel injections to heterogenize the fuel mixture comprises carrying out a fuel injection in one of the pipes in a larger proportion than the fuel injection in the other pipe.

8. The control method as claimed in claim 3 wherein fuel supply means feed fuel directly into combustion chamber and fuel supply means feed fuel indirectly into combustion chamber, and controlling the fuel injection parameters of fuel supply means to achieve heterogenization of the fuel mixture comprises carrying out a fuel injection through fuel indirect supply means and in feeding the fuel mixture into the combustion chamber, then in carrying out a fuel injection in the combustion chamber to obtain a fuel mixture.

9. The control method as claimed in claim 1, wherein the spark-ignition internal-combustion engine is a supercharged engine.

10. The control method as claimed in claim 1, wherein the spark ignition device is a spark plug.

* * * * *